United States Patent Office 2,785,975
Patented Mar. 19, 1957

2,785,975

CELLULOSE FIBER PRODUCT CONTAINING LATEX SOLIDS AND A CONJOINTLY PRECIPITATED HIGH MOLECULAR WEIGHT PHENOL-ALDEHYDE RESIN-REACTION PRODUCT, AND METHOD OF PRODUCING SAID PRODUCT

Norman J. Sheeran, Seattle, Wash., assignor to American-Marietta Company, Adhesive, Resin and Chemical Division, Seattle, Wash., a corporation of Illinois No Drawing. Application October 30, 1953,
Serial No. 389,486

27 Claims. (Cl. 92—3)

The present invention relates to the production of cellulosic articles as, for example, cellulosic sheets and mats, said mats having had incorporated therein a rubbery latex and a high molecular weight phenol-aldehyde resin condensation product which is well advanced toward its insoluble infusible stage, but has not attained this stage, said phenol-aldehyde resin being ethanol insoluble, said resin being exemplified by the resin produced in accordance with the procedure set forth in Redfern Reissue Patent No. 23,347. The rubber latex may be a naturally occurring latex or a synthetic latex.

When the latex and phenol-aldehyde resin condensation product are incorporated in the cellulosic article, the physical properties of the final article, such as the wet and dry tensile strength and the wet and dry Mullen bursting strengths, are substantially improved, and this improvement is generally greater than that which results from the incorporation of only the phenol-aldehyde resin or only the latex.

It has been discovered that a cellulose sheet in which there has been conjointly incorporated a high molecular weight phenol-aldehyde resin and a synthetic latex has an unexpected increase in stiffness, the increase being substantially greater than that resulting from the incorporation of the high molecular weight resin alone or the synthetic latex alone.

While various latices may be used in carrying out the present invention, it is preferred to use a butadiene-acrylonitrile copolymer latex as, for example, Chemigum 245B manufactured by the Goodyear Tire & Rubber Company of Akron, Ohio. The physical constants of the butadiene-acrylonitrile latex known under the trademark Chemigum 245B are as follows:

| | |
|---|---|
| Approximate monomer ratio of butadiene to acrylonitrile | 67/33 |
| Particle size, Angstroms | 1250 |
| pH | 10.0 |
| Surface tension, dynes/cm.$^2$ | 55 |
| Viscosity, centipoises | 35 |
| Film Mooney, small rotor | 50 |

The butadiene-acrylonitrile monomer ratio of 67/33 means that 67 parts by weight of butadiene are reacted with 33 parts by weight of acrylonitrile to form the resulting copolymer.

The butadiene-acrylonitrile latex copolymer material herein used defines an aqueous dispersion of elastomeric materials, that is, materials of the rubber type compounds. When alum is added to a cellulosic pulp material to which there has been introduced the composition containing butadiene-acrylonitrile copolymer and a high molecular weight phenol-aldehyde condensation product as, for example, the condensation product produced by the resin set forth in Redfern Reissue Patent No. 23,347, the phenolic resin is precipitated and the latex is coagulated. Due to the use of the high molecular resin, a greater proportion of the resin is precipitated onto the pulp fibers due to the resin being insoluble in acid solution, and this in turn is due to the relatively high molecular weight of the resin. The high molecular weight resin while in aqueous solution in the form of its alkaline salt in the pulp furnish does not penetrate the fibers like a low molecular weight resin and is, therefore, available for bonding the fibers together after it has been precipitated in acid solution. The coagulated latex mixes with this high molecular weight resin which has the peculiar properties pointed out and, therefore, does not penetrate into the interior of the fibers. In other words, there is a peculiar combination between the high molecular weight resin of the character pointed out and the precipitated latex and this, of course, is not limited to the specific latex identified by the trade designation Chemigum 245B, but is applicable in general to synthetic latices, including butadiene-styrene latices. The latter latices do not work as well as the butadiene-acrylonitrile latices since there is little polarity in the butadiene-styrene polymer molecule; that is, the polymer particles do not stick so well to the pulp fibers, but are lost in the water drained from the sheet. However, when used in combination with the high molecular weight resins of the character herein set forth, these resins due to their peculiar property of not penetrating into the fibers of the pulp like a low molecular weight resin would do, in a measure assist the butadiene-styrene latices to stick to the individual pulp fibers.

It is within the province of the present invention to mix the high molecular weight phenol-aldehyde resin of the character herein more fully set forth in combination with neoprene latices and add the composition to a paper furnish. It has, of course, been proposed to use both the butadiene-styrene latices and the neoprene latices as an additive material for cellulosic pulp furnishes. These neoprene latices may be described as an alkaline aqueous solution of 2-chlorobutadiene 1.3 with a pH of 12.

It is also within the province of the present invention to introduce into the paper furnish and incorporate in the cellulosic pulp and the articles made therefrom, a combination of a high molecular weight phenol-aldehyde resin as, for example, a high molecular weight phenol-formaldehyde resin in combination with Vinsol, polyvinyl acetate, polystyrene, polyamides, and the like. These emulsions, of course, must be able to satisfy the properties deemed necessary in latices in order for them to be available for use in accordance with the present invention.

In general the latex additive composition must be such that it is possible to break the latex emulsion so that the latex particles from the emulsion are reasonably uniformly distributed throughout the pulp furnish in such a manner that the freeness of the pulp is not excessively reduced or that the cellulosic sheets made from the pulp are not excessively tacky and will not stick to the paper-making equipment. In general, the latices that coagulate excessively, that is, form large latex particles composed of smaller latex particles, will tend to reduce freeness of the pulp furnish and cause sticking. The efficiency of the latex, even if it is uniformly distributed throughout the pulp slurry, depends largely on its retention by the pulp fibers during the sheet formation. The high molecular weight phenol-aldehyde resins and particularly the phenol-formaldehyde resins produced in accordance with Redfern Reissue Patent No. 23,347, do assist the latex particles in being retained by the pulp fibers and so a new and unique result is obtained by using the high molecular weight phenol-aldehyde resin in combination with any of the latices herein set forth and particularly the butadiene-acrylonitrile latices.

Further, it must be possible to uniformly precipitate or to coagulate the latex in the manner herein described, either in acid or alkaline solution or by precoagulation of the latex before it is added to the pulp furnish. In general, to obtain a satisfactory retention of the herein described phenol-aldehyde high molecular weight beater addition resins, the pH of the furnish pulp should be adjusted to a value between the limits of approximately 3.5 and approximately 6.7. If the furnish is too acid, excessive corrosion of the paper-making equipment occurs, and the quality of the cellulosic sheet is somewhat inferior. In solutions approaching neutrality, that is, a pH of 7.0, and in alkaline solutions, that is, solutions having a pH greater than 7.0, the resin and latex are not completely coagulated, and therefore a substantial portion of these materials are lost in the water draining from the sheet.

While the coagulation should be in an acid solution, it can be carried out in an alkaline solution. For example, material such as calcium chloride will coagulate both the resin and latex solids to a certain degree in an alkaline paper furnish. However, the resin is not completely coagulated and the latex will tend to be sticky, resulting in poor sheet formation and sticking to the paper-making equipment. Therefore, for best results the paper furnish should be an acid medium.

The following examples are illustrative of the present invention:

Five one-foot square sheets of a commercial saturating felt, weighing a total of about 233 grams on a bone dry basis, were torn into small pieces about one inch square. The saturating felts were low density pulp sheets which normally would be impregnated with asphalt to form a base for printed floor coverings. These squares were added to 18,000 grams of water at room temperature, that is, 20° C., and the squares were disintegrated, that is, repulped, for about 1.5 hours by means of a propeller type stirrer. To this furnish 18,400 grams of water were added at room temperature, reducing the pulp consistency from about 1.3% to about 0.65%.

There was added to the so-produced pulp 35 grams of a butadiene-acrylonitrile latex emulsion, preferably and more specifically Chemigum 245B as received from the manufacturer. This dispersion contained about 33% latex solids. Therefore, the amount of latex solids added to the cellulosic pulp furnish was equal to 5% of the weight of the bone dry pulp. The so-treated pulp was thoroughly mixed to insure uniform dispersion of the latex. Preferably, the pulp furnish was agitated for a period varying between 5 to 15 minutes. However, this period of agitation is exemplary and is not to be taken by way of limitation.

There was then added to the paper pulp an aqueous solution of a high molecular weight phenol-aldehyde resin prepared as hereinafter specifically described, although, equivalents thereof could be added. More specifically, 35 grams of an alkaline aqueous solution of a phenol-formaldehyde resin prepared as herein set forth and having a pH of about 12.3 was added to the pulp furnish and the mixture was agitated to insure uniform dispersion of the phenol-formaldehyde resin condensation product. Here again the time of agitation may be greatly varied. Illustratively, it may vary between 5 and 15 minutes. However, obviously this time of agitation may vary greatly in accordance with the amounts of materials being treated and the specific physical and chemical characteristics of the material being treated. The high molecular weight phenol-formaldehyde resin solution contained about 33% of phenol-formaldehyde resin solids equivalent to 5% of the weight of the bone dry cellulosic pulp. It is desired to point out that the phenol-formaldehyde resin as it is added to the paper furnish is in the form of the sodium salt of the resin as found in alkaline solution. The resin which was added had a formaldehyde to phenol molar ratio of 2.5 to 1, and the resin was ethanol insoluble. This resin had been condensed until it attained a high molecular weight and approached the insoluble infusible state but never attained it, all as set forth in Redfern Reissue Patent No. 23,347, the disclosure of which is by reference herein incorporated.

The cellulosic pulp furnish prepared as above set forth was then treated with paper-maker's alum solution until the pH of the furnish was $5.0 \pm 0.1$. Mixing was continued to equalize the pH throughout the pulp furnish. For example, the pulp furnish may be agitated for a period of 5 to 15 minutes.

Laboratory hand sheets were prepared by taking 4,000 cubic centimeters of the so-produced furnish, diluting the furnish to about 0.3% consistency and forming sheets therefrom. Since the pH of the furnish tended to increase in the sheet mold, the pH was adjusted to 5.0, this being accomplished by the introduction of a small amount of alum solution.

The sheets after formation were couched, pressed between a drying disc on one side and about seven sheets of heavy blotting paper on the other side, and were then inserted in drying rings to dry under tension. The sheets were 47 square inches in area, were approximately 0.048 inch thick, and weighed about 18 grams. The sheets were then cured for 24 hours at 250° F.

These sheets were tested to ascertain their physical properties and at the same time there was tested:

(a) A control sheet, that is, one that was made by the identical process set forth with the exception that it had no resin solids and no latex solids;

(b) A sheet made with prior art phenol-aldehyde condensation product, that is, one that was not of high molecular weight, said sheet containing no latex solids;

(c) A sheet made with phenol-formaldehyde resin of high molecular weight produced as herein specifically described and as set forth in Redfern Reissue Patent No. 23,347, said sheet containing no latex solids;

(d) A sheet made with 5% latex solids taken on the bone dry pulp and containing no phenol-aldehyde resin;

(e) A cellulosic sheet containing a low weight phenol-formaldehyde resin condensation product in the amount of 5% resin solids based on the bone dry weight of the pulp furnish and also containing 5% butadiene-acrylonitrile latex solids, and (f) A sheet made in accordance with the present invention and containing both the high molecular weight phenol-formaldehyde resin as specifically herein set forth and as set forth in the Redfern reissue patent in the amount of 5% solids taken on the weight of the bone dry solids, and butadiene-acrylonitrile latex solids in the amount of 5% latex solids.

The above referred to sheets a–f, inclusive, were all produced in accordance with the specific example set forth with the exception that the control had no resin solids and no latex solids, and the remainder of the sheets were produced from a furnish which had the usual prior art phenol-formaldehyde resin with or without latex solids, the latex solids in all cases being that produced from the herein described Chemigum 245B. The results of the tests are set forth in the following Table I:

TABLE I

| Resin | Percent Resin Solids [1] | Percent Latex Solids [2] | Dry Tensile, Lbs. per Inch | Wet Tensile, Lbs. per Inch [3] | Dry Burst, Points | Relative Stiffness [4] |
|---|---|---|---|---|---|---|
| (a) Control | 0 | 0 | 30.8 | 8.5 | 45.8 | 1.00 |
| (b) Prior art low molecular weight phenol formaldehyde resin | 5.0 | 0 | 34.6 | 18.7 | 45.0 | 1.06 |
| (c) High molecular weight phenol formaldehyde resin produced as herein set forth | 5.0 | 0 | 60.0 | 31.2 | 79.8 | 1.27 |
| (d) No resin | 0.0 | 5.0 | 37.6 | 17.6 | 65.0 | 0.93 |
| (e) Prior art low molecular weight phenol-formaldehyde resin | 5.0 | 5.0 | 48.8 | 31.6 | 68.9 | 1.08 |
| (f) High molecular weight phenol-formaldehyde resin produced as herein set forth | 5.0 | 5.0 | 66.5 | 37.6 | 88.7 | 1.86 |

[1] Resin solids, not total solids, added to pulp furnish.
[2] Chemigum 245B used. Product of Goodyear Tire & Rubber Co.
[3] 24 hour soak at approximately 25° C.
[4] Based on control sheets containing no resin or latex as 1.00.

Referring to Table I it is noted that when the high molecular weight resin prepared as herein set forth is used with the butadiene-acrylonitrile latex solids, that the dry tensile strength of the resulting sheet was substantially greater than when the equivalent sheet was incorporated with only a high molecular weight phenol-formaldehyde resin or only the latex solids, so it can be said in general that when the paper furnish is treated with both the high molecular weight phenol-formaldehyde resin as herein set forth and latex solids, and particularly synthetic latex solids of the character herein set forth, equivalents having been specifically cited, there is a material increase in the dry tensile strength of the sheet. Further, there is a material increase in the wet tensile strength of the sheet, and the dry bursting point of the sheet is substantially increased. The relative stiffness of the sheet was also notably greater, that is, 1.86 as compared to 1.27 when the pulp furnish was only treated with the high molecular weight phenol-formaldehyde condensation product condensed so that it approached the insoluble infusible state but never attained it, all as set forth in Redfern Reissue Patent No. 23,347 and as particularly set forth herein. In producing said high molecular weight phenol-formaldehyde condensation product, the condensation is carried out so that the resin reaction product is advanced to a stage that is very close to the final C-stage, and this advanced stage is designated as the "incipient C-stage" in order to distinguish it from the A-stage, the B-stage, and the C-stage, as defined by Baekeland.

The dry tensile tests were made in accordance with TAPPI Standard T404m–50. Wet tensile tests, using a 24-hour soak period at 25° C., were made in accordance with TAPPI Standard T456m–49. Dry burst points refers to the hydrostatic pressure, expressed in pounds per square inch, on the test gauge which is necessary to produce rupture of the dry sheet, and in this connection the tests were carried out in accordance with TAPPI Standard T403m–52.

Stiffness was determined by a modification of the method listed on page 718 of ASTM Standards 1949, Part IV, such method being ASTM Designation D1037–49T. The modification of this method is as follows:

Two knife edge supports were placed parallel to each other at a distance of 1.46" apart. A test specimen 2" long and 1" wide was laid on top of these knife edges so that the 1" direction was parallel to the knife edges, resulting in a test area of 1.46" long by 1" wide. A loading arm, consisting of a cylinder of 0.75" diameter, was centered above the test specimen with the axis of the cylinder being parallel to the knife edge supports and perpendicular to the 1" dimension of the paper. The cylinder was lowered until it just touched the test specimen uniformly across its width along a line parallel to the knife edges and halfway between them. The force, using this loading arm, to cause 0.08" of downward deflection in the center of the strip was measured with a Schopper paper tensile tester. This deflection was also measured with a Schopper tensile tester.

The stiffness was calculated by the following formula:

$$E = \frac{FC}{T^3}$$

E = stiffness expressed as a number with no units.
C = a constant for the apparatus which cannot be easily calculated.
T = thickness of test specimen.
F = measured force necessary to cause deflection.

Now since C is a constant, the stiffness, expressed as a number with no units can be calculated from measurable data by the equation $$E = F/T^3$$

Referring to Table I it is clear that the calculated mathematical relative stiffness of the high molecular weight phenol-aldehyde resin latex sheets is 1.27 (Example c) plus 0.93 (Example d), the sum of which is 2.20, and when this is divided by two, the stiffness coefficient is 1.10. However, the relative stiffness of the sheets of the present invention, as shown in Table I, is not 1.10, but is 1.86, as shown in Example f. In other words, there is an increase in the relative stiffness of 69% over what would be normally expected, said increase being obtained by using a combination of the high molecular weight phenol-formaldehyde resin and latex. This increased stiffness of the sheet may find application in many industries, including the preparation of innersoles for shoes, corrugated and fiberboard box stock, fibrous tubing, and structural and building boards from pulp or wood fibers.

In making the pulp furnish the pulp or wood fibers used may include kraft fibers, sulfite fibers, soda processed fibers, ground wood pulp, reclaimed newsprint, rag pulp, recovered broke, mechanical wood fibers, or various mixtures of these components. It may be stated that the latex dispersions or emulsions utilized in carrying out the present invention are stable in alkaline aqueous solutions and disperse well in a dilute pulp furnish and can be coagulated upon the pulp fibers conjointly with the high molecular weight resin particles by the addition of a coagulating and/or precipitating agent such as well known in the art and which will change the pH of the solution from alkaline to acid, this being carried out satisfactorily by the addition of alum, the pH being between the limits of 3.5 and 6.7 or at least on the acid side and below the neutrality pH of 7.0. Alum acid mixtures usually do not work with latices. However, in carrying out the present invention the resin latex can be precipitated or coagulated with acid alum mixtures when a high molecular weight phenol-formaldehyde resin condensation product of the character herein set forth is added in solution form and carries 5% resin solids, and likewise the latex is added in emulsion form to the paper furnish and said emulsion carries 5% of latex solids, both of said percentages being based on the dry weight of the pulp, which is the bone dry weight.

In carrying out the present invention, the most satisfactory results have been obtained when the high molecular weight phenol-aldehyde condensation product produced as hereinbefore described and as set forth in Redfern Reissue Patent No. 23,347, is added to the pulp so that the pulp contains between about 0.5% and 7.5% of resin solids, these percentages being by weight on the bone dry pulp. For example, if to 100 grams of dry pulp there is added 15.6 grams of an alkaline solution of the above-mentioned resin containing 32% resin solids, there will be added 15.6×0.32 or 5 grams of resin solids to 100 grams of pulp. This is equivalent to 5% resin solids based on the weight of the dry pulp.

Likewise, most satisfactory results are obtained when the latex solids are present in the pulp in an amount between the limits of 0.5% and 25% taken on the weight of the bone dry pulp. For example, in working with Chemigum 245B which was used in the example previously given, the butadiene-acrylonitrile solution contained approximately 33% of latex solids. This latex contains about 67% water and 33% rubber solids. Therefore, if 100 parts of bone dry pulp are taken and there is added thereto 100 grams of latex solution above described, there has been added 33 grams of latex solids to 100 grams of dry pulp, or 33% latex solids based on the dry pulp.

While it has been stated that the latex solids should vary between the limits of 0.5% and 25%, it is recognized that the latex solids may be increased to 50% taken on the bone dry pulp. In some cases the latex solids can be present in the pulp in an amount between 0.5% and 200% as, for example, 67% or 100% or 150%, said percentage being taken on the bone dry weight of the cellulosic fiber content of the cellulosic product.

The amount of phenol-aldehyde condensation product of the character herein set forth and the amount of latex solids added is to a very substantial extent tied up with the drainage rate of the pulp, it being kept in mind that one of the factors that limits the amount of phenol-formaldehyde resin condensation product as prepared in accordance with Reissue Patent No. 23,347, which can be added to the pulp furnish is that said high molecular weight resin reduces the freeness of the pulp furnish, and by that is meant, said resin reduces the rate at which water can be drained from the sheet during the papermaking process or boardmaking process. It may be stated that the drainage rate of the pulp furnishes are primarily dependent upon:

1. The freeness characteristics of the type of pulp used. Some pulps drain readily and others do not.
2. The weight of the sheet made. Heavier sheets drain less readily than lighter sheets.
3. The effect of the resin and latex additives upon the freeness of the pulp.

With a very free pulp and with a lightweight sheet as, for example, a sheet that weighs 10 pounds per thousand square feet, it may be possible to add a resin to the pulp furnish in an amount so that the pulp furnish contains between 15 and 20% of resin solids of the character set forth in Redfern reissue patent, said percentage being taken on the bone dry weight of the pulp. However, with a less free pulp and when a heavy sheet is made as, for example, a sheet that weighs 100 pounds per 1000 square feet, it is generally not feasible to incorporate the resin in the pulp furnish in an amount greater than 5% of resin solids taken on the weight of the bone dry pulp.

Specific examples of the amount of resin solids and latex solids which are added to the pulp are as follows, the resin being the resin, the preparation of which is herein set forth and which is in general set forth in Redfern Reissue Patent No. 23,347, said percentages being taken on the bone dry weight of the pulp:

TABLE II

| Phenol-aldehyde condensation resin solids, percent | Latex solids, percent |
|---|---|
| 2.5 | 7.5 |
| 5.0 | 5.0 |
| 7.5 | 2.5 |

In the above Table II the latex solids were those resulting from the butadiene-acrylonitrile copolymer known as Chemigum 245B. Instead of using Chemigum 245B, there could be used Chemigum 245, and the Hycar latices manufactured and merchandised by the B. F. Goodrich Chemical Company. The Hycar 1500 series are stable suspensions of individual spherical particles of butadiene-acrylonitrile copolymers. Regular Hycar 1561 (OR-15 type) and 1562 (OR-25 type) latices have a particle size of approximately 600 Angstrom units. The high total solids Hycar 1551 (OR-15 type) and 1552 (OR-25 type) latices have a particle size of about 2000 Angstrom units.

It may be stated that the properties imparted to the paper produced from the pulp furnish by the joint addition of a resin of the character herein set forth and a latex of the character herein set forth may be varied over quite a large range by suitable choice of the latex used in conjunction with the phenol-aldehyde condensation product, which is limited to a particular kind of phenol-formaldehyde condensation product as, for example, a high molecular weight resin, and more specifically that produced as set forth in Redfern Reissue Patent No. 23,347. It may be pointed out that by the joint use of said resin and various latices, it is possible to produce sheets with properties that may be varied over a wider range than if either latices or the high molecular weight resin were used separately. By the joint use of beater addition latices and the resin of Reissue Patent No. 23,347, sheets of paper and boards and various other articles may be produced and with properties varying over a wide range.

When using alum as the pH adjusting agent, the most satisfactory results are obtained when the high molecular weight resin of the character herein set forth is added to the pulp furnish in an amount not exceeding 7.5% of resin solids taken on the dry weight of the pulp. This is because with the use of alum, there is a substantial reduction in pulp freeness, and the loss of freeness means that it is more difficult to drain water from the wet mat, and to compensate for this, other measures, such as a reduced machine speed or additional water removing devices may be used. Using alum as a pH regulator, good results have been produced when the latex solids were present in an amount equivalent to 7.5% latex solids taken on the bone dry weight of the pulp. When the herein-described resin was present in an amount of 7.5% taken on the bone dry weight of the pulp, the latex solids were present from 22% or 33% to 60% taken on the weight of the bone dry pulp.

When using a 50–50 alum-sulfuric acid mixture as a pH regulating agent, no loss of freeness was observed when the herein-described high molecular weight resin produced as set forth in the Redfern reissue patent was added to the pulp in an amount of 5.0 phenolic resin solids and the latex was present in an amount of 5.0%, said latex solids being butadiene-acrylonitrile copolymer solids. Using the 50–50 alum-sulfuric acid mixture the upper limit of the resin solids added to the paper furnish may be in the neighborhood of 100% to 200%. As stated before, the amount of resin that can be added when using alum is limited because the high molecular weight resin reduces the pulp freeness and were it not for this reduction in pulp freeness, more of the resin solids could be added. However, using a different regulating agent, namely, a mixture of sulfuric acid and alum which is used in the ordinary sense in which it is used in papermaking, this mixture being preferably made by mixing 50% concentrated sulfuric acid with 50% alum, the freeness reduction is not as great using an alum-sulfuric acid mixture as when using alum alone.

The following is a specific example setting forth the preparation of a resin condensation product which may be used in carrying out the present invention:

*Example*

Material: Parts by weight
- 90% phenol _____ 365
- Water _____ 205
- 37% formaldehyde _____ 708
  - Mix at 20–25° C.
- Add 50% NaOH _____ 146
  - Add one-half of the NaOH. Wait 5 minutes, and add remainder slowly over a ten-minute period. Reaction is exothermic, and cooling water is usually necessary in kettle jacket.
  - Bring the resulting mass to reflux, about 99–101° C., in 80 to 100 minutes. Cooling water is usually necessary to keep the exothermic reaction under control.
- Add 50% NaOH _____ 46
  - Condense at 78° C. to viscosity of 2.0 to 2.7 poises. Start cooling to room temperature (20° C.)
- Add:
  - 50% NaOH _____ 24
  - Water _____ 5
  - Add NaOH when a temperature of less than 60° C. is obtained. Cool to room temperature.

The resulting resin had the following physical constants:

pH _____ 12.3
Formaldehyde/phenol molar ratio _____ 2.5 to 1.0
Percent NaOH _____ 7.2
Percent solids _____ 41.5
Approximate percent resin solids _____ 32.5
Vicosity _____ poises __ 1.2 to 1.5

In general, it may be stated that the process of producing the thermosetting phenol-aldehyde resin condensation product comprises forming an aqueous mixture of a phenol which may be selected from the group consisting of phenol, cresol, and xylenol, and an aldehyde in which preferably the aldehyde group is the sole reactive group, there also being present an inorganic alkaline catalyst accelerating the formation of the resin reaction product on heating, said catalyst expressed as sodium hydroxide being present in an amount equivalent to not over 10% based on the dry weight of the total mix constituents. The molar ratio of the aldehyde as, for example, formaldehyde or any of the other aldehydes herein set forth, to the monohydric phenol may vary from 1:1 to 3:1. The mix produced as set forth in heat-reacted to produce a water-soluble phenol-aldehyde reaction product, the viscosity of the latter increasing during this initial reaction period and being indicative of the advancement of the water-soluble reaction product towards a stage where the water-soluble state terminates, said aldehydes retaining its activity during the formation of the water-soluble phenol-aldehyde reaction product. To said initial resin condensation product there is alternately added an alkali metal hydroxide and then after each addition of alkali metal hydroxide, the so-treated resin reaction product is heated. Each time the alkali metal hydroxide is added, there is a reduction in the viscosity of the water-soluble resin reaction product and the tendency of the water-soluble resin reaction product to progress to a water-insoluble stage, thereby permitting a further condensation of the resin reaction mass without conversion of the resin reaction mass to a water-insoluble state. The additions of the alkali metal hydroxide are terminated while the resin reaction product is in a water-soluble stage. The resulting aqueous solution of the water-soluble resin reaction product shows a precipitate upon the addition of ethanol. The alkali metal hydroxide increases the pH of the finally condensed product and the pH is usually between neutrality, that is, 7, and 14, and more often between 9.5 and 14. The expression "phenol" as herein used is to be given its recognized meaning in the art and includes monohydric phenol in which one hydroxyl group is attached to the carbon ring.

While formaldehyde and its equivalents are the preferred aldehyde for producing the high molecular weight resin, other aldehydes may be used, such as acetaldehyde, furfuraldehyde, and benzaldehyde.

The finished sheets prepared in accordance with the present invention may in many instances be cured, and the curing time may be greatly varied depending on the kind of curing agent used. Thus, for example, the sheet may be cured for 60 seconds at about 400° F. by using infra red heating, as compared with a heating period of one hour at 260° F. and using the ordinary steam-heated press.

The curing time necessary to obtain optimum results at any one temperature generally varies inversely with the amount of moisture present during the curing cycle; that is, a heavy sheet that retains at least part of its moisture content for a longer time than a lighter sheet, generally will cure more rapidly than a lighter sheet that loses its water in a relatively short time. For example, the process of making hardboard is a procedure that facilitates the cure of the phenol-aldehyde resin condensation product due to the continuous presence of moisture during most of the pressing cycle.

Further, a curing time at any one temperature is dependent upon such factors as the desired improvement in physical properties, the amount of moisture initially present, and the rate of moisture removal during the curing cycle. Heat is usually necessary to cure the high molecular weight phenol resins to obtain optimum strength properties in the cellulose product produced in accordance with the present invention. However, this is subject to the limitation that there can be a substantial improvement in the dry tear and the dry Mullen bursting strength, and the dry and wet tensile strength of a product produced in accordance with the present invention where no heating is employed. In other words, by the conjoint use of the high molecular weight Redfern resin of Reissue Patent No. 23,347 used conjointly with a beater addition of latex as herein specified, the above properties are greatly improved even though the resulting sheet is not cured under heat. Good results have been obtained when curing for a period of 0.5 to 24 hours at 250° C. of air-dried sheets. It is obvious that the longer the time of curing, the temperature may be materially decreased. For example, the sheets may be cured at a temperature of 160° C. Experiments have been carried out curing at 160° C. for 70 hours. While this can be done, there seems to be some impairment of the wet tensile strength or, stated differently, the wet tensile strength is not as good when the air-dried sheet is heated 70 hours at 160° C. as it is when heated 1.0 hour at 250° C. Yet the wet strength can be obtained by heating 60 seconds at 400° F. if infra red heating is utilized. Therefore, the upper limit of heating may be 300° to 400° F. and the time very short as, for example, 60 seconds.

The following Table III shows the results obtained by infra red heating for the listed number of seconds, said time of heating being effective to obtain a surface temperature of approximately 400° F. The infra red heating results are shown in columns 6-9, inclusive. The results obtained by heating in an oven at 260° F. are shown in columns 2, 3, 4 and 5.

the alkaline salts of the alkali metals that may be used during this initial reaction period are the carbonates and oxides of sodium, potassium, lithium, calcium, barium,

TABLE III

| Test | 1 | 2 | 3 | 4 | 5 | 6 | 7 | 8 | 9 |
|---|---|---|---|---|---|---|---|---|---|
| | Control No Latex or No Resin | Linoleum Felt Handsheets Weighing Approximately 9½# per 1,000 sq. ft. and being about 0.036" thick. 2.5% resin +7.5% Chemigum 245B added. | | | | | | | |
| | | 0 Min., 260° F. | 10 Min., 260° F. | 30 Min., 260° F. | 60 Min., 260° F. | 5 Sec., 400° F. | 10 Sec., 400° F. | 30 Sec., 400° F. | 60 Sec., 400° F. |
| Dry Elmendorf Tear, Grams | 274 | 472 | 416 | 429 | 423 | 464 | 496 | 416 | 360 |
| Dry Tensile, Pounds/Inch Width | 33.7 | | | | 64.1 | | | | |
| Dry Mullen Burst, Points | 55.3 | 109 | 122 | 125 | 131 | 108 | 102 | 124 | 106 |
| Wet Tensile, Pounds/Inch Width | Less than one | 13.6 | 18.6 | 30.9 | 39.5 | 17.7 | 17.0 | 31.4 | 36.9 |

Infrared heating for the listed number of seconds was used to obtain a surface temperature of approximately 400° F.

Referring to the specific example showing the production of the high molecular weight phenol-aldehyde resin, it may be stated that the amount of alkaline catalyst used in effecting the initial condensation of the phenol and the aldehyde may broadly vary from about 1.00 to 10% on the weight of the phenol and preferably varies between about 2.0% and about 5.0%, and more specifically between 2.08 and 5.32% taken on the weight of the phenol. Expressed differently, the amount of alkaline constituent used for catalyzing the initial reaction between the phenol and the aldehyde should be that amount which is capable of producing an alkalinity equivalent preferably to that produced by 0.049 to 0.125 mol of sodium hydroxide per mol of phenol and more broadly this may vary from 0.025 to 0.20 mol of sodium hydroxide per mol of phenol.

It is recognized that the initial condensation may be effected without the use of an alkaline catalyst and that later on successive additions of the alkaline material may be added for the purpose of resolubilizing the phenol-aldehyde condensation product, all as herein specifically disclosed. However, when the alkaline catalyst is not used, the time for producing the initial condensation product of the aldehyde and the phenol is very substantially increased and, therefore, commercially the initial reaction between the aldehyde and the phenol will be effected in the presence of an alkaline catalyst.

The total amount of alkaline catalyst used in carrying out the process, that is, the initial alkaline material utilized for catalyzing the reaction between the phenol and the aldehyde and the successive additions of alkaline material used for resolubilizing the alkaline salt of the phenol-aldehyde condensation product may vary between about 4% and about 85 to 90% taken on the weight of the phenol. The total amount of alkaline material present as, for example, sodium hydroxide should be such as to produce a finally condensed product in solution as the sodium salt having an alkalinity between about 9.5 and about 14, this being set forth in Redfern Reissue Patent No. 23,347. In the specific example set forth in the present application, the pH of the alkali salt in solution is 12.3.

It is desired to point out that the addition of alkaline material as, for example, sodium hydroxide or any equivalent materials, in small quantities while progressing the reaction is helpful in curbing side reactions, such as the Cannizzaro reaction.

In producing the initial resin condensation product by condensing phenol, cresol, or xylenol with an aldehyde as, for example, formaldehyde, many, if not all, of the bases of the alkali metals and the alkaline salts of the alkali metals may be used as the catalyst during the initial reaction period. Some of the bases of the alkali metals and and magnesium. The catalyst during the initial reaction period may be an organic compound as, for example, a highly concentrated organic amine, such as the ethanol amines. However, after the initial condensation product is produced, the alkaline additions are best made with sodium hydroxide. The function of the sodium hydroxide during the addition steps is to raise the pH of the alkaline solution of the phenol-aldehyde condensation product and thereby increase the solubility of the sodium salt of the phenol-aldehyde condensation product in its aqueous alkaline carrying medium. In general, the pH of the final condensation product should vary from 9 or 9.5 to 14.

The pulp slurry used in carrying out the invention may have a pulp consistency varying from 1% to 5%. In other words, the pulp solids may comprise 1%, 2%, 3%, 4%, or 5% of the pulp slurry. With the dilution of the pulp to below 3% solids, and these solids are cellulosic solids or mostly cellulosic solids, more of the rubbery latex particles may be incorporated in the pulp.

There can be produced in accordance with the present invention an improved felt base suitable as a linoleum base. Not only can a product of the above character be produced, but there can also be produced paper products, a specific example of which has been given, hardboards, softboards, and the like.

Instead of using Chemigum 245B, Chemigum 245 may be used, the latter having an extra amount of soap as compared to Chemigum 245B for the purpose of improving mechanical stability. Of course, both of these latices are butadiene-acrylonitrile latices.

In the herein set forth example showing the production of a specific phenol-aldehyde condensation product, the molar ratio of the phenol to the formaldehyde was 2.5:1 and the resulting condensation product well advanced toward the C-stage but never attaining the C-stage, was ethanol-insoluble. It is obvious that the orderly addition of the latex or resin may be reversed or these can be added to the furnish at points other than the beater.

In making a mat in accordance with the present invention, the latter may be made on fourdriniers, cylinder machines, or deckle boxes.

During the drying and curing process, heated rolls, ovens, infra red heating, or hot presses or combinations of these methods of heating may be employed.

While it has been stated that the pulp consistency may vary from 1% to 5% solids, the pulp consistency may be lower as, for example, 0.3% solids.

In general, the cellulosic article produced in accordance with the present invention may be cured at a temperature between the limits of about 75° C. and 400° C.

for a period of time between the limits of 10 seconds and 70 hours.

Flooring felts were produced in accordance with the general procedure set forth for the production of the sheets, the properties of which appear in Table I, said sheets containing a high molecular weight phenol-formaldehyde resin having a molecular weight as determined by diffusion coefficients in the range of 40,000 to 50,000 and preferably the resin produced in the Redfern Reissue Patent No. 23,347; said sheet also containing the butadiene-acrylonitrile latex solids of the same kind as set forth in the production of the sheets, the properties of which appear in Table I. The results of a series of experiments wherein flooring felts were produced and wherein the percentage of resin solids, the percentage of latex solids, and the time of cure were varied, are set forth in the following table:

TABLE IV

| Percent Resin Solids | Percent Latex Solids | Cure Time, Hours | Cure Temp., °F. | Precipitant | Dry Tensile, #/Inch | Net Tensile, #/Inch | Dry Burst Points | Relative Stiffness |
|---|---|---|---|---|---|---|---|---|
| 2.5 | 7.5 | 24 | 250 | Alum | 59 | 33 | 86 | 1.37 |
| 2.5 | 7.5 | 2.5 | 250 | Alum | | 27 | 61 | |
| 7.5 | 2.5 | 24 | 250 | Alum | 66 | 35 | 83 | 1.61 |
| ¹5.0 | ¹5.0 | 24 | 250 | Alum | 55 | 25 | 68 | |
| 5.0 | 5.0 | 24 | 250 | Alum-H₂SO₄ | 64 | 32 | 83 | 1.75 |
| 5.0 | 5.0 | 8 | 250 | Alum-H₂SO₄ | 60 | 37 | 91 | |

¹ Resin and latex were mixed together before addition to pulp.

The following is a further example showing the production of flooring felts. In this example the conditions were similar to those in Table I, column 5, with the exception that the high molecular weight resin contained 2.5% resin solids taken on the bone dry weight of the paper pulp, said resin being the resin set forth in Redfern Reissue Patent No. 23,347, said resins in general having a molecular weight between 40,000 and 50,000. The latex solids comprise butadiene-acrylonitrile latex solids, and these were added to the paper pulp in the amount of 7.5% latex solids taken on the bone dry weight of the pulp, the butadiene acrylonitrile latex solids being merchandised under the designation Chemigum 245B, previously herein referred to.

This material was cured at 250° F., the curing time for different batches varying from 2½ to 70 hours. The following Table V sets forth the dry tensile strength in pounds per inch width, the wet tensile strength in pounds per inch width, and the dry burst points.

TABLE V

| Curing Time, Hours | Dry Tensile, #/Inch width | Wet Tensile, #/Inch width | Dry Burst Points |
|---|---|---|---|
| 2.5 | 47 | 15 | 60 |
| 5.0 | 49 | | 64 |
| 10.0 | 50 | 19 | 67 |
| 20.0 | 50 | 22 | 66 |
| 70.0 | | 25 | |

The following is a further example showing the production of linoleum felts using the same kind of resin condensation product and the same kind of latex solids used in the examples, the results of which are set forth in Tables I, IV and V. Separate batches of the felts were not cured, and then were cured at a temperature of 176° F. for ten days.

The results of the experiments are set forth in the following table:

TABLE VI

| Percent Resin Solids | Percent Latex Solids | Dry Tensile, #/Inch | | Wet Tensile, #/Inch | | Dry Burst Points | |
|---|---|---|---|---|---|---|---|
| | | No Cure | Cured | No Cure | Cured | No Cure | Cured |
| 2.5 | 7.5 | 45 | 55 | 16 | 33 | 84 | 64 |
| 5.0 | 5.0 | 43 | 52 | 11 | 34 | 84 | 90 |
| 3.75 | 11.25 | 56 | 58 | 21 | 39 | 114 | 100 |
| 7.5 | 7.5 | 49 | 57 | 13 | 27 | 92 | 93 |

It is desired to set forth that the conjoint use in the production of sheets and felts of latex solids and a high molecular weight resin typified by the resins produced in accordance with the procedure set forth in Redfern Reissue Patent No. 23,347, and in general by resins having a molecular weight between 40,000 and 50,000 and in general phenol-aldehyde and particularly phenol-formaldehyde resins having a molecular weight between 40,000 and 50,000, promotes considerably higher strength values than are obtained using a prior art phenol-aldehyde resin in conjunction with a synthetic latex of the character herein set forth. This is particularly well shown by the results set forth in Table I.

It may be stated that it has been discovered that the high molecular weight phenol-aldehyde resins and particularly the high molecular weight phenol-formaldehyde resins having a molecular weight between 40,000 and 50,000 should not be used much in excess of 5%, since in excess of this amount the freeness impairment as herein previously set forth begins to appear.

It is further desired to point out that there is an unexpected increase in stiffness when a high molecular weight resin of the character set forth is used in conjunction with synthetic latex of the character set forth, this being clearly shown by the results set forth in Tables I, and IV. In general, the floor felt sheets and the linoleum felt sheets should be characterized by a relative stiffness between 1.3 and about 2.0, the norm for said stiffness being a similar product having the same cellulose constituents but with no resin or latex, said board having a stiffness coefficient of 1.00. The normal range for the stiffness coefficient may be between the limits of 1.4 and 1.8 or 2.0, and satisfactory results are produced when the stiffness coefficient is between about 1.6 and about 1.8 or about 2.0.

It is desired to further point out that the conjoint use of synthetic latices and the high molecular weight phenol-aldehyde resin of the character herein set forth produces a substantial improvement in sheet properties without heating. The wet strength, for example, obtained with no heating is increased many times, and also this wet strength further increases substantially upon heating the sheet.

It is desired to point out that latex promotes wet strength without the necessity for curing, and this is known in the prior art. However, the phenol-aldehyde high molecular weight resin also promotes wet strength without heating, the resin drying out in its acid precipitated form.

In some instances it may be desirable to produce a product where the product when taken off the paper machine has increased wet and dry strength properties, and thereafter the ultimate wet strength can be obtained by heating at some later time.

The Vinsol emulsion may be defined as an aqueous emulsion of terpene residues which remain as still bottoms after the distillation of tree stumps for such naval stores as pine oil and turpentine.

The formula for acid alum is as follows:

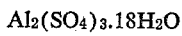

$$Al_2(SO_4)_3 \cdot 18H_2O$$

Where in the specification and claims it is stated that the phenol-aldehyde resin has a molecular weight as determined by diffusion coefficients in the range of 40,000 to 50,000, it is to be understood that 40,000 to 50,000 represents the average molecular weight.

The cellulose fiber product produced as herein set forth and bonded with a mixture of butadiene-acrylonitrile solids and an infusible insoluble thermoset phenol-aldehyde reaction product may have a wet tensile strength in pounds per inch width between about 33 and 35, and a dry tensile strength between about 60 and 80 pounds per square inch.

The term "cured" is used in the present specification in accordance with the usual significance in the art to denote that the cellulose composition has been heat-treated to convert the phenol-aldehyde resin component of the cellulose composition to its insoluble infusible state.

What is claimed is:

1. The method of forming a cured cellulose fiber product comprising incorporating in a slurry of cellulose fibers a mixture of a latex emulsion and a solution of a condensed thermosetting resin-reaction product formed by heat-reacting an aqueous mixture of a monohydric phenol, an aldehyde in which the aldehyde radical is the sole reactive radical, and an alkaline catalyst in an amount accelerating the formation of the initial resin-reaction product on heating, the molar ratio of the aldehyde to the phenol being between the limits of 1:1 to 3:1, said reaction product being well advanced toward the insoluble infusible stage by the repeated addition thereto of alkali metal hydroxide with a condensation step between each addition of alkaline metal hydroxide, said additions of alkali metal hydroxide being terminated while the resin-reaction product is in a water-soluble stage, said water soluble reaction product being condensed to a stage where the aqueous solution of the condensed mass shows a precipitate upon the addition of ethanol, said phenol-aldehyde resin-reaction product being normally water soluble in alkaline solution, in situ precipitating from the resulting slurry said resin-reaction product while conjointly coagulating the latex solids from the latex emulsion, removing liquid from said slurry, drying the resulting cellulosic product, and curing the so-produced article until the precipitated resin is converted into its insoluble infusible state.

2. The method defined in claim 1 in which the phenol-aldehyde condensation product is added in an amount between the limits of 2.5% and 7.5% of resin solids, and the latex solids are added in an amount between the limits of 7.5% and 2.5%, said percentages being taken on the bone dry weight of the pulp.

3. The method defined in claim 1 in which the latex solids are butadiene-styrene latex solids.

4. The method defined in claim 1 in which the monohydric phenol is phenol per se and the aldehyde is formaldehyde.

5. The method defined in claim 1 in which the monohydric phenol is phenol per se, the aldehyde is formaldehyde, and the latex emulsion is a butadiene-acrylonitrile emulsion.

6. The method of forming a cured cellulose fiber product comprising incorporating in a pulp slurry of cellulose fibers a mixture of a butadiene-acrylonitrile emulsion containing latex solids, and a solution of a condensed thermosetting resin-reaction product formed by heat-reacting an aqueous mixture of a monohydric phenol, an aldehyde in which the aldehyde radical is the sole reactive radical, and an alkaline catalyst in an amount accelerating the formation of the initial resin-reaction product on heating, the molar ratio of the aldehyde to the phenol being between the limits of 1:1 to 3:1, said reaction product being well advanced toward the insoluble infusible stage by the repeated addition thereto of alkali metal hydroxide with a condensation step between each addition of alkaline metal hydroxide, said additions of alkali metal hydroxide being terminated while the resin-reaction product is in a water-soluble stage, said water-soluble reaction product being condensed to a stage where the aqueous solution of the condensed mass shows a precipitate upon the addition of ethanol, said phenol-aldehyde resin-reaction product being normally water soluble in alkaline solution, acidifying said pulp slurry and in situ precipitating therefrom the high molecular weight phenol-aldehyde resin reaction-product while conjointly coagulating the latex solids from the latex emulsion, removing liquid from said slurry, drying the resulting cellulose article, and curing the so-produced article until the precipitated resin is converted into its insoluble infusible state.

7. The method defined in claim 1 in which the deliquefied cellulose article is cured at a temperature between the limits of 75° and 400° C. for a period of time between the limits of 10 seconds and 70 hours.

8. The method of forming a cellulose fiber product comprising incorporating in a plup slurry of cellulose fibers a mixture of an emulsion of latex solids, and a solution of a condensed thermosetting resin-reaction product formed by heat-reacting an aqueous mixture of a monohydric phenol, an aldehyde in which the aldehyde radical is the sole reactive radical, and an alkaline catalyst in an amount accelerating the formation of the initial resin-reaction product on heating, the molar ratio of the aldehyde to the phenol being between the limits of 1:1 to 3:1, said reaction product being well advanced toward the insoluble infusible stage by the repeated addition thereto of alkali metal hydroxide with a condensation step between each addition of alkali metal hydroxide, said additions of alkali metal hydroxide being terminated while the resin-reaction product is in a water-soluble stage, said water-soluble reaction product being condensed to a stage where the aqueous solution of the condensed mass shows a precipitate upon the addition of ethanol, said phenol-aldehyde resin-reaction product being normally water soluble in alkaline solution, the presence of said highly condensed high molecular weight resin in the pulp slurry exerting a tendency to reduce the pulp freeness which in turn reduces the amount of resin solids which may be uniformly incorporated in the pulp and in products produced therefrom, acidifying said pulp slurry with an alum-sulfuric acid mixture, and in situ precipitating said resin-reaction product from the slurry and from its alkaline solution in the form of a high molecular weight phenol-aldehyde resin while conjointly coagulating the latex solids from the latex emulsion, said alum-sulfuric acid acidifying medium counteracting the tendency of the pulp in the presence of said high molecular weight resin to have its freeness reduced, forming the resulting slurry a dry cellulose fiber product, and curing the so-produced product until the condensed high molecular weight resin is converted into its insoluble infusible state.

9. The method of forming a cellulose fiber product comprising incorporating in a slurry of cellulose fibers a mixture of a latex emulsion and a solution of a condensed thermosetting resin-reaction product formed by heat-reacting an aqueous mixture of a monohydric phenol, an aldehyde in which the aldehyde radical is the sole reactive radical, and an alkaline catalyst in an amount accelerating the formation of the initial resin-reaction product on heating, the molar ratio of the aldehyde to the phenol being between the limits of 1:1 to 3:1, said reaction product being well advanced toward the insoluble infusible stage by the repeated addition thereto of alkali metal hydroxide with a condensation step between each addition of alkaline metal hydroxide, said additions of alkali metal hydroxide being terminated while the resin-reaction product is in a water-soluble stage, said water soluble reaction product being condensed to a stage where the aqueous solution of the condensed mass shows a precipitate upon the addition of ethanol, said phenol-aldehyde resin-reaction product being normally water soluble in alkaline solution, in situ precipitating said resin-reaction product from said slurry and from its alkaline solution and conjointly coagulating the latex solids from the latex emulsion, and forming from the resulting slurry a dry cellulose fiber product.

10. The method of forming a cured cellulose fiber product comprising incorporating in a slurry of cellulose fibers a mixture of rubbery latex solids and an alkaline solution of a highly condensed ethanol-insoluble thermosetting phenol-aldehyde resin reaction-product of a monohydric phenol and an aldehyde in which the aldehyde radical is the sole reactive radical, the molar ratio of the aldehyde to the phenol being between the limits of 1:1 to 3:1, the highly condensed reaction-product having a molecular weight between 40,000 and 50,000, in situ precipitating from said slurry said reaction-product while conjointly coagulating the rubbery latex solids, forming from the resulting slurry a dry cellulose fiber product, and curing the latter until the highly condensed precipitated phenol-aldehyde resin is converted into its insoluble infusible form.

11. The method of forming a cellulose fiber product comprising incorporating in a slurry of cellulose fibers a mixture of rubbery latex solids and an alkaline solution of a highly condensed ethanol-insoluble thermosetting phenol-aldehyde resin reaction-product of a monohydric phenol and an aldehyde in which the aldehyde radical is the sole reactive radical, the molar ratio of the aldehyde to the phenol being between the limits of 1:1 to 3:1, the highly condensed reaction-product having a molecular weight between 40,000 and 50,000, in situ precipitating from said slurry said reaction-product while conjointly coagulating the latex solids, and forming from the resulting slurry a dry cellulose fiber product.

12. A cured cellulose fiber product of improved dry and wet tensile strength, the fibers of said product being bonded with a mixture of coagulated rubbery latex solids and a phenol-aldehyde resin which is the converted infusible water-insoluble resin of the highly condensed resin reaction-product formed by heat-reacting an aqueous mixture of a monohydric phenol and an aldehyde in which the aldehyde radical is the sole reactive radical, and an alkaline catalyst in an amount accelerating the formation of the initial resin reaction-product on heating, the molar ratio of the aldehyde to the phenol being between the limits of 1:1 to 3:1, said reaction product being well advanced toward the insoluble infusible stage by the repeated addition thereto of alkali metal hydroxide with a condensation step between each addition of alkali metal hydroxide, said additions of alkali metal hydroxide being terminated while the resin-reaction product is in a water-soluble stage, said water-soluble reaction product being condensed to a stage where the aqueous solution of the condensed mass shows a precipitate upon the addition of ethanol, said condensed phenol-aldehyde resin-reaction product being normally water-soluble in alkaline solution, said water-soluble reaction-product having been precipitated on said fibers while conjointly coagulating the latex solids, said mixture of latex solids and infusible and insoluble thermoset phenol-aldehyde resin reaction-product being substantially uniformly distributed throughout the cellulose fiber product.

13. The cellulose fiber product defined in claim 12 wherein there is present between about 2.5% and about 7.5% of resin solids and between about 7.5% and about 2.5% of latex solids taken on the bone dry weight of the cellulose-content of the cellulose product.

14. The cellulose fiber product defined in claim 13 in which the monohydric phenol is phenol per se and the aldehyde is formaldehyde.

15. The cellulose fiber product defined in claim 12 wherein there is present between about 2.5% and about 7.5% of resin solids and between about 7.5% and about 2.5% of latex solids taken on the bone dry weight of the cellulose-content of the cellulose product, the latter being characterized by a relative stiffness between the limits of 1.3 and 2.0, the norm for said stiffness being a similar product having the same cellulose constituents but no resin or latex and a stiffness coefficient of 1.00.

16. The cellulose fiber product defined in claim 15 in which the monohydric phenol is phenol per se and the aldehyde is formaldehyde.

17. The cellulose fiber product defined in claim 12 in which the rubbery latex solids are butadiene-acrylonitrile latex solids.

18. The cellulose fiber product defined in claim 12 wherein there is present between about 2.5% and about 7.5% of resin solids and between about 7.5% and about 2.5% of butadiene-acrylonitrile latex solids taken on the bone dry weight of the cellulose-content of the cellulose product.

19. The cellulose fiber product defined in claim 12 wherein there is present between about 2.5% and about 7.5% of resin solids and between about 7.5% and about 2.5% of butadiene-acrylonitrile latex solids taken on the bone dry weight of the cellulose-content of the cellulose product, the latter being characterized by a relative stiffness between the limits of 1.3 and 2.0, the norm for said stiffness being a similar product having the same cellulose constituents but no resin or latex and a stiffness coefficient of 1.00.

20. The cellulose fiber product defined in claim 12 wherein the latex solids are butadiene-styrene latex solids.

21. The method defined in claim 12 in which the monohydric phenol is phenol per se and the aldehyde is formaldehyde.

22. A cured cellulose fiber product of improved dry and wet tensile strength, the fibers of said product being bonded with a mixture of coagulated rubbery latex solids and a phenol-aldehyde resin which is the converted infusible water-insoluble resin of a highly condensed alkali-soluble, ethanol-insoluble reaction-product of a monohydric phenol and an aldehyde in which the aldehyde radical is the sole reactive radical, the molar ratio of the aldehyde to the phenol being between the limits of 1:1 to 3:1, said resin reaction-product having been precipitated on said fibers while conjointly coagulating said rubbery latex solids, the highly condensed reaction product having prior to its conversion a molecular weight between the limits of about 40,000 and about 50,000.

23. The product defined in claim 22 in which the fibers of the cured cellulose product are bonded with a mixture of coagulated rubbery latex solids and a conjointly precipitated phenol-aldehyde resin, said cellulose product being characterized by a relative stiffness between the limits of 1.3 and 2.0, the norm for said stiffness being a similar product having the same cellulose constituents but no resin or latex and a stiffness coefficient of 1.00.

24. A cured cellulose fiber product of improved dry and wet tensile strength, and fibers of said product being bonded with a mixture of coagulated rubbery latex solids and a phenol-aldehyde resin which is the converted infusible water-insoluble resin of a condensed alkali-soluble, ethanol-insoluble reaction-product of a monohydric phenol and an aldehyde in which the aldehyde radical is the sole reactive radical, the molar ratio of the aldehyde to the phenol being between the limits of 1:1 to 3:1, said reaction-product prior to curing and conversion to its insoluble-infusible state being condensed until it is advanced to the incipient C-stage, where it approaches its insoluble-infusible state but never attains the same, said resin reaction-product having been precipitated on said fibers while conjointly coagulating the latex solids.

25. A cellulose fiber product of improved dry and wet tensile strength, the fibers of said product being bonded with a mixture of coagulated rubbery latex solids and a precipitated condensed alkali-soluble, ethanol-insoluble resin-reaction product of a monohydric phenol and an aldehyde in which the aldehyde radical is the sole reactive radical, the molar ratio of the aldehyde to the phenol being between the limits of 1:1 to 3:1, said resin reaction-product having been precipitated on said fibers while conjointly coagulating said rubbery latex solids, said resin-reaction product having been condensed until it has a molecular weight between the limits of about 40,000 and about 50,000 and approaches but is never converted into its infusible insoluble state.

26. The cellulose fiber product defined in claim 25 in which the rubbery latex solids are butadiene-acrylonitrile latex solids.

27. The method defined in claim 25 in which the monohydric phenol is selected from the group consisting of phenol per se, cresol, and xylenol.

References Cited in the file of this patent

UNITED STATES PATENTS

| | | |
|---|---|---|
| Re. 23,347 | Redfern | Mar. 20, 1951 |
| 1,160,362 | Baekeland | Nov. 16, 1915 |
| 2,474,801 | Owen | June 28, 1949 |
| 2,563,897 | Wilson et al. | Aug. 14, 1951 |
| 2,613,190 | Feigley | Oct. 7, 1952 |
| 2,631,097 | Redfern | Mar. 10, 1953 |
| 2,650,163 | Horsey et al. | Aug. 25, 1953 |
| 2,668,111 | Lindquist | Feb. 2, 1954 |